(No Model.)

W. WELLOCK.
SHOE LACE FASTENER.

No. 454,314. Patented June 16, 1891.

WITNESSES:
Fred G. Dieterich
Edw. W. Byrn.

INVENTOR:
William Wellock.
BY
ATTORNEYS

UNITED STATES PATENT OFFICE.

WILLIAM WELLOCK, OF SALT LAKE CITY, UTAH TERRITORY.

SHOE-LACE FASTENER.

SPECIFICATION forming part of Letters Patent No. 454,314, dated June 16, 1891.

Application filed February 25, 1891. Serial No. 382,840. (No model.)

*To all whom it may concern:*

Be it known that I, WILLIAM WELLOCK, of Salt Lake City, in the county of Salt Lake, Utah Territory, have invented a new and useful Improvement in Shoe-Lace Fasteners, of which the following is a specification.

The object of my invention is to provide a simple, cheap, and effective fastener for securing the ends of shoe-laces; and it consists in the pecular construction and arrangement of the parts of a button or clasp made all in one piece and designed to be set in the leather of the shoe, after the manner of an eyelet, as hereinafter fully described.

Figure 1:
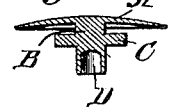
Figure 2:
Figure 3:

Figure 1 is a side view, partly in section, of the fastener. Fig. 2 is a similar view of a modification, and Fig. 3 shows side views of different sizes of blanks from which the fastener is formed.

In the drawings, A represents the head of the fastener, which is about one thirty-second of an inch thick.

C is a circumferential flange located about one-sixteenth of an inch from the head, leaving a reduced neck portion B between. At the lower end of the shank is a hollowed-out or cup-shaped portion D, which, when the shank is seated in the leather, is expanded, like an eyelet, to clasp the leather between the eyelet and the flange C. The lace end is secured by being wrapped between the head and the flange C, which are sufficiently close together to clamp and hold the laces.

Instead of making the fastener with an eyelet D, it may have four (more or less) clinching-prongs, as in Fig. 2.

These fasteners are formed in one piece of metal from blanks, as shown in Fig. 3, which may be of different sizes, as shown.

I am aware that various shoe-lace fasteners have heretofore been constructed which are designed to be seated in the leather by clinching and around which the lace is merely wrapped in order to secure it. My invention is distinctive in this novel construction, that the outer disk or head A is of much larger diameter than the subjacent flange C, and is dished or bent down at its outer edge toward the flange. This causes the edge or periphery of the head A to slightly bury in the lace at the point where the wraps cross and forms a detent that holds the lace against becoming unwrapped.

Having thus described my invention, what I claim as new is—

A shoe-lace fastener consisting of a body portion having a flange C, with a head A of greater diameter than the flange and lying close to the same and dished or concaved on the under side and extending at its outer periphery downwardly toward the flange, and having upon the opposite side an expanding or clinching end, the whole being made in one piece, substantially as shown and described.

WILLIAM WELLOCK.

Witnesses:
 DELANCEY WILSON,
 JOHN FORRESTER.